United States Patent
Roundy

(10) Patent No.: US 9,166,995 B1
(45) Date of Patent: Oct. 20, 2015

(54) SYSTEMS AND METHODS FOR USING USER-INPUT INFORMATION TO IDENTIFY COMPUTER SECURITY THREATS

(71) Applicant: Symantec Corporation, Mountain View, CA (US)

(72) Inventor: Kevin Roundy, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 59 days.

(21) Appl. No.: 14/033,777

(22) Filed: Sep. 23, 2013

(51) Int. Cl.
*H04L 9/00* (2006.01)
*H04L 29/06* (2006.01)

(52) U.S. Cl.
CPC ........ *H04L 63/1425* (2013.01); *H04L 63/1441* (2013.01)

(58) Field of Classification Search
CPC ............ H04L 63/1433; H04L 63/1441; H04L 63/1416; H04L 63/1408; H04L 63/145; H04L 63/1425; G06F 21/50; G06F 21/577
USPC ............................................... 726/22, 24, 25
See application file for complete search history.

(56) References Cited

U.S. PATENT DOCUMENTS

| 8,015,114 | B1 | | 9/2011 | Nachenberg | |
| 8,132,258 | B1 | * | 3/2012 | Jensen et al. | 726/24 |
| 8,661,062 | B1 | * | 2/2014 | Jamail et al. | 707/802 |
| 8,775,333 | B1 | * | 7/2014 | Zahn | 706/12 |
| 2005/0043961 | A1 | * | 2/2005 | Torres et al. | 705/1 |
| 2009/0007219 | A1 | * | 1/2009 | Abzarian et al. | 726/1 |
| 2010/0263049 | A1 | * | 10/2010 | Cross et al. | 726/23 |
| 2011/0185056 | A1 | * | 7/2011 | Mchugh et al. | 709/224 |
| 2012/0066763 | A1 | * | 3/2012 | McHugh et al. | 726/22 |
| 2012/0304249 | A1 | * | 11/2012 | Luo et al. | 726/1 |
| 2013/0097709 | A1 | * | 4/2013 | Basavapatna et al. | 726/25 |
| 2013/0298230 | A1 | * | 11/2013 | Kumar et al. | 726/22 |
| 2014/0157421 | A1 | * | 6/2014 | Hay et al. | 726/25 |

OTHER PUBLICATIONS

Douglas Gibson, et al; Systems and Methods for Predicting the Impact of Security-Policy Changes on Users; U.S. Appl. No. 13/779,550, filed Feb. 27, 2013.
Fanglu Guo, et al; Systems and Methods for Detecting Security Threats Based on User Profiles; U.S. Appl. No. 14/024,636, filed Sep. 12, 2013.
Kevin Roundy, et al; Systems and Methods for Using Event-Correlation Graphs to Detect Attacks on Computing Systems; U.S. Appl. No. 14/041,762, filed Sep. 30, 2013.

* cited by examiner

*Primary Examiner* — Matthew Smithers
(74) *Attorney, Agent, or Firm* — ALG Intellectual Property, LLC

(57) ABSTRACT

A computer-implemented method for using user-input information to identify computer security threats may include (1) detecting activity at a computing system, (2) determining whether a user provided input at the computing system when the activity occurred, (3) determining that the activity indicates a potential security threat based at least in part on whether the user provided input at the computing system when the activity occurred, and (4) performing a security action on the activity in response to the determination that the activity indicates a potential security threat. Various other methods, systems, and computer-readable media are also disclosed.

20 Claims, 7 Drawing Sheets

SYSTEMS AND METHODS FOR USING USER-INPUT INFORMATION TO IDENTIFY COMPUTER SECURITY THREATS

BACKGROUND

In recent years, individuals and organizations have become increasingly concerned with protecting their networks and computing resources from malicious attacks. Malicious attacks on network and computing resources often vary widely in their degree of sophistication and/or complexity. For example, rudimentary or unsophisticated attacks may rely on exploits or attacks that are not especially complex, intelligent, or sophisticated. Advanced Persistent Threats (APTs), in contrast, often utilize relatively intelligent or sophisticated exploits or attacks that persist over an extended period of time.

While rudimentary or unsophisticated attacks may be relatively easy to identify or detect, system administrators often have trouble identifying or detecting APTs since the behavior of these attacks often appear to be similar to the behavior of legitimate non-malicious users. For example, APTs may use the same or similar commands and applications that legitimate non-malicious users use to manage systems in an attempt to mask their illegitimate traffic and/or behavior, potentially frustrating the efforts of system administrators to distinguish between the same.

Accordingly, the instant disclosure identifies a need for systems and methods capable of more accurately identifying security threats, especially systems and methods capable of more accurately distinguishing between the behavior of APTs and the innocuous behavior of legitimate non-malicious users.

SUMMARY

As will be described in greater detail below, the instant disclosure generally relates to systems and methods for using user-input information to identify computer security threats. In one example, a computer-implemented method for using user-input information to identify computer security threats may include (1) detecting activity at a computing system, (2) determining whether a user provided input at the computing system when the activity occurred, (3) determining that the activity indicates a potential security threat based at least in part on whether the user provided input at the computing system when the activity occurred, and (4) performing a security action on the activity in response to the determination that the activity indicates a potential security threat.

In some embodiments, the step of determining whether the user provided input at the computing system when the activity occurred may include determining that the user did not provide input at the computing system when the activity occurred, and the determination that the activity indicates a potential security threat may be based at least in part on the determination that the user did not provide input at the computing system when the activity occurred.

In some embodiments, the step of determining that the user did not provide input at the computing system when the activity occurred may include determining that the user was not physically present at the computing system when the activity occurred, and the determination that the activity indicates a potential security threat may be based at least in part on the determination that the user was not physically present at the computing system when the activity occurred.

In some embodiments, the step of determining that the user did not provide input at the computing system when the activity occurred may include determining that an input device of the computing system was not used to provide input at the computing system when the activity occurred, and the determination that the activity indicates a potential security threat may be based at least in part on the determination that the input device of the computing system was not used to provide input at the computing system when the activity occurred.

In some embodiments, the step of determining that the user did not provide input at the computing system when the activity occurred may include determining that a device driver for an input device of the computing system was inactive when the activity occurred, and the determination that the activity indicates a potential security threat may be based at least in part on the determination that the device driver for the input device of the computing system was inactive when the activity occurred.

In some embodiments, the step of determining that the user did not provide input at the computing system when the activity occurred may include determining that the computing system did not receive user input when the activity occurred, and the determination that the activity indicates a potential security threat may be based at least in part on the determination that the computing system did not receive user input when the activity occurred.

In some embodiments, the step of determining that the activity indicates a potential security threat may include (1) determining, before detecting the activity at the computing system, that it is abnormal for the activity to occur at the computing system when the user does not provide input at the computing system and (2) determining that the activity indicates a potential security threat based at least in part on the determination that it is abnormal for the activity to occur at the computing system when the user does not provide input at the computing system.

In some embodiments, the step of determining that the activity indicates a potential security threat may include (1) identifying user-input patterns of a group of users, (2) determining, before detecting the activity at the computing system and based at least in part on the user-input patterns of the group of users, that it is abnormal for the activity to occur at a computing system of at least one user within the group of users when the user within the group of users does not provide input at the computing system of the user within the group of users, and (3) determining that the activity indicates a potential security threat based at least in part on the determination that it is abnormal for the activity to occur at the computing system of the user within the group of users when the user within the group of users does not provide input at the computing system of the user within the group of users.

In some embodiments, the step of determining whether the user provided input at the computing system when the activity occurred may include determining that the user provided input at the computing system when the activity occurred, and the step of determining that the activity indicates a potential security threat may include (1) tracking, before detecting the activity at the computing system, when the user provides input at the computing system, (2) determining, before detecting the activity at the computing system, a pattern of when the user provides input at the computing system, (3) determining that the activity occurred at a time that does not fit the pattern of when the user provides input at the computing system, and (4) determining that the activity represents a possible security threat based at least in part on the determination that the activity occurred at a time that does not fit the pattern of when the user provides input at the computing system.

In some embodiments, the step of determining whether the user provided input at the computing system when the activity occurred may be based at least in part on determining when the user last provided input at the computing system.

In some embodiments, the step of determining that the activity indicates a potential security threat may include determining that the activity is an unauthorized attempt to remotely access the computing system based at least in part on a determination that the user provided input at the computing system when the activity occurred and/or a determination that the user was not physically present at the computing system when the activity occurred.

In one embodiment, a system for implementing the above-described method may include (1) an activity-detecting module that detects activity at a computing device, (2) an input-determining module that determines whether a user provided input at the computing device when the activity occurred, (3) a threat-determining module that determines that the activity indicates a potential security threat based at least in part on whether the user provided input at the computing device when the activity occurred, (4) a security module that performs a security action on the activity in response to the determination that the activity indicates a potential security threat, and (5) at least one processor that executes the activity-detecting module, the input-determining module, the threat-determining module, and the security module.

In some examples, the above-described method may be encoded as computer-readable instructions on a non-transitory computer-readable-storage medium. For example, a computer-readable-storage medium may include one or more computer-executable instructions that, when executed by at least one processor of a computing device, may cause the computing device to (1) detect activity at a computing system, (2) determine whether a user provided input at the computing system when the activity occurred, (3) determine that the activity indicates a potential security threat based at least in part on whether the user provided input at the computing system when the activity occurred, and (4) perform a security action on the activity in response to the determination that the activity indicates a potential security threat.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
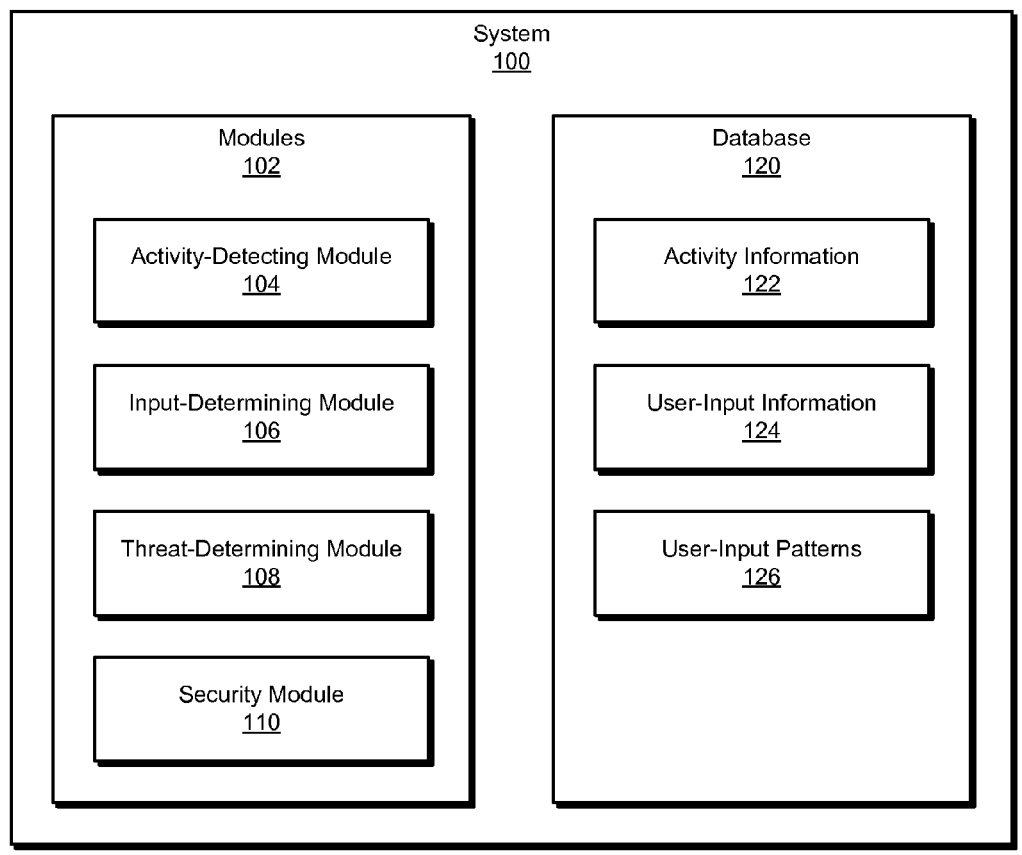
FIG. 1 is a block diagram of an exemplary system for using user-input information to identify computer security threats.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for using user-input information to identify computer security threats. As will be explained in greater detail below, by leveraging user-input information that indicates if, when, and/or how users provide input at computing systems, the systems and methods described herein may enable detection of security threats. Furthermore, in some examples, by using user-input information that indicates when a user provides input at a computing system to establish a pattern of when the user provides input at the computing system, the systems and methods described herein may detect anomalous user-input events. Embodiments of the instant disclosure may also provide various other advantages and features, as discussed in greater detail below.

Figure 2:
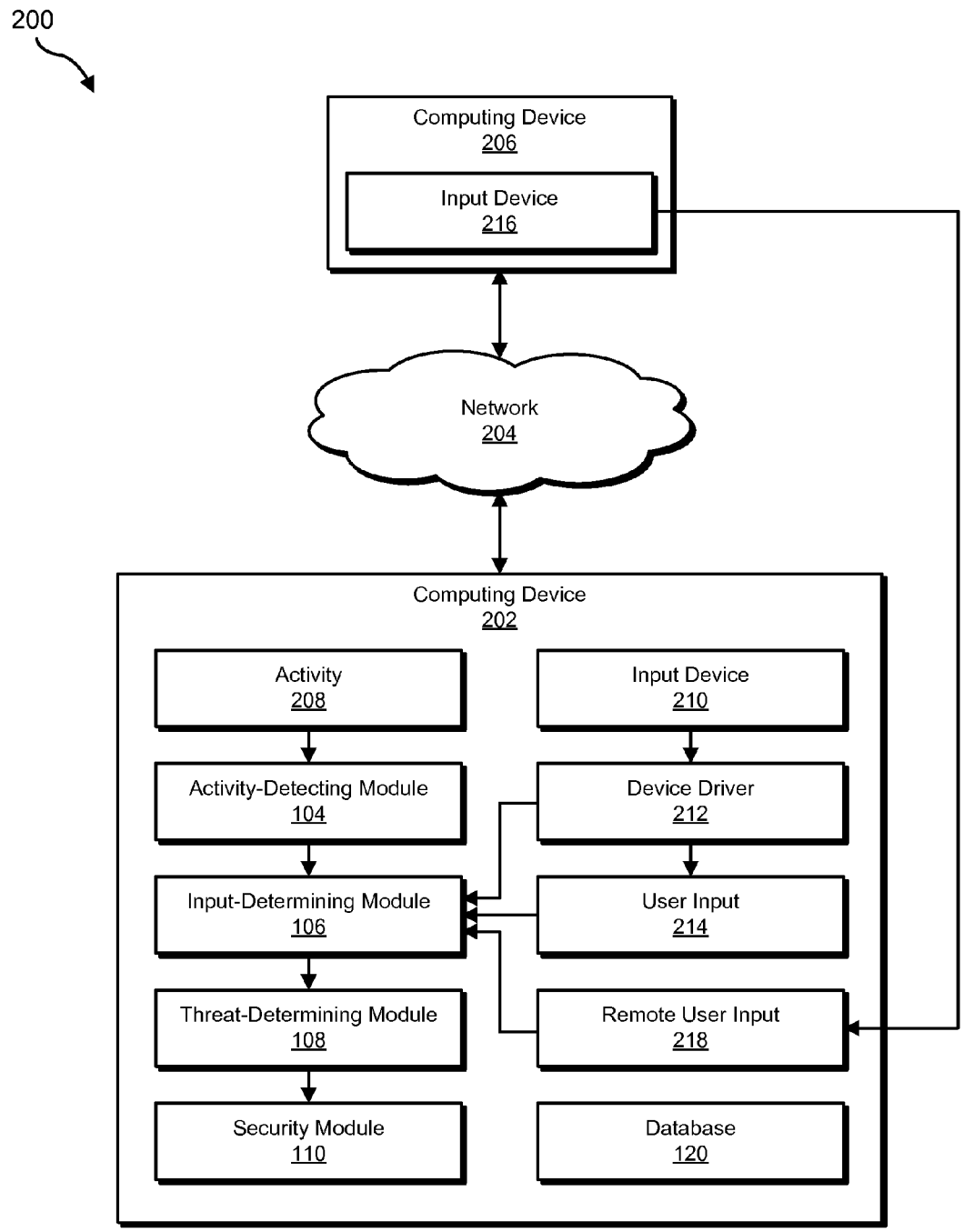
FIG. 2 is a block diagram of an exemplary system for using user-input information to identify computer security threats.
Figure 3:
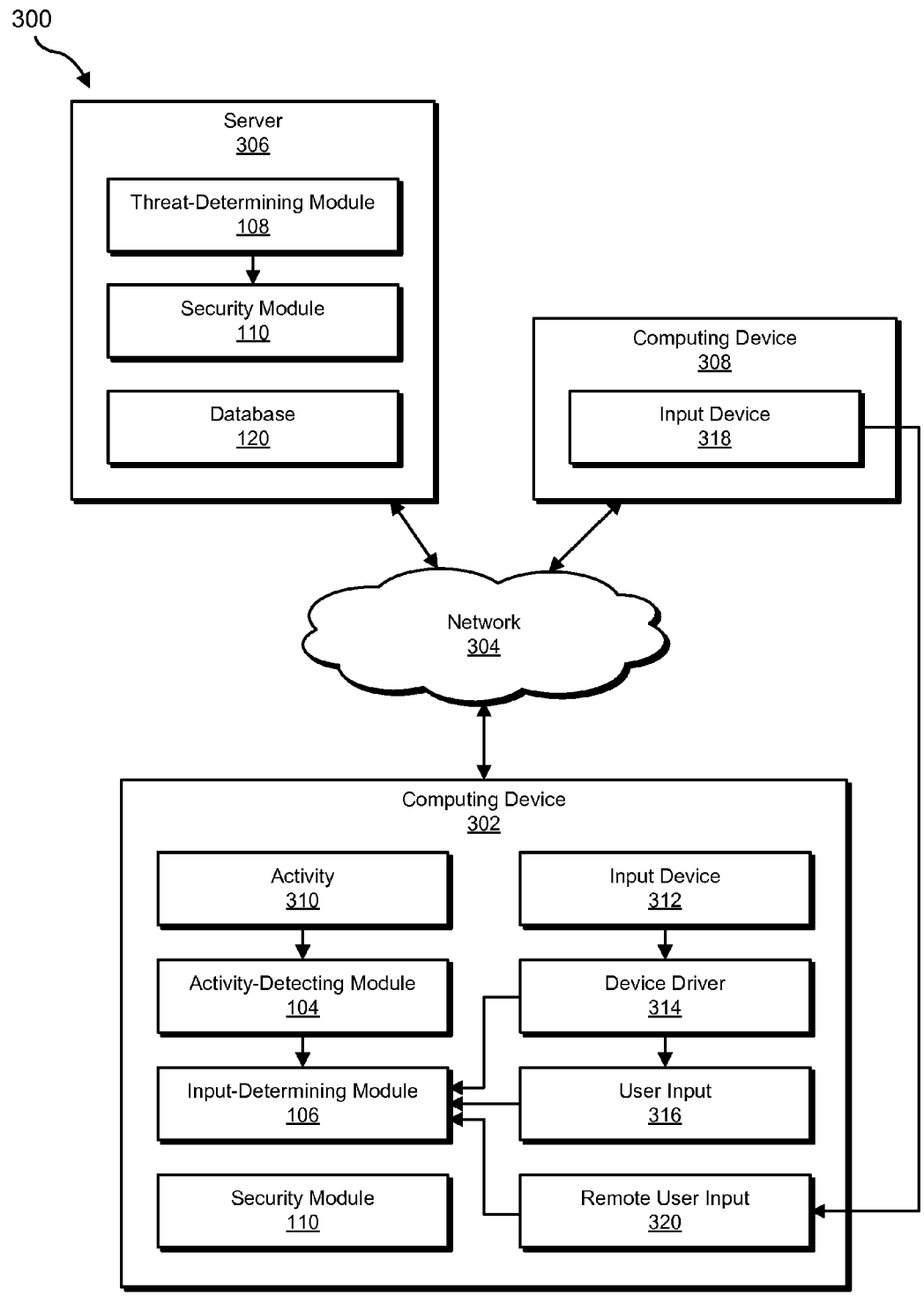
FIG. 3 is a block diagram of an exemplary system for using user-input information to identify computer security threats.

The following will provide, with reference to FIGS. 1-3, detailed descriptions of exemplary systems for using user-input information to identify computer security threats. Detailed descriptions of corresponding computer-implemented methods will also be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for using user-input information to identify computer security threats. As illustrated in this figure, exemplary system 100 may include one or more modules 102 for performing one or more tasks. For example, and as will be explained in greater detail below, exemplary system 100 may include an activity-detecting module 104 that detects activity at a computing system. Exemplary system 100 may also include an input-determining module 106 that determines whether a user provided input at the computing system when the activity occurred.

In addition, and as will be described in greater detail below, exemplary system 100 may include a threat-determining module 108 that determines that the activity indicates a potential security threat based at least in part on whether the user provided input at the computing system when the activity occurred. Exemplary system 100 may also include security module 110 that performs a security action on the activity in response to the determination that the activity indicates a potential security threat. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), the devices illustrated in FIG. 3 (e.g., computing device 302 and/or server 306), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include activity information 122 for storing information about one or more activities, user-input information 124 for storing information about one or more user-input events, and/or user-input patterns 126 for storing information about one or more user-input patterns.

Database 120 may represent portions of a single database or computing device or a plurality of databases or computing devices. For example, database 120 may represent a portion of computing device 202 in FIG. 2, server 306 in FIG. 3, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 in FIG. 2, server 306 in FIG. 3, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 206 via a network 204. In one example, computing device 202 may be programmed with one or more of modules 102 and/or may store all or a portion of the data in database 120. Additionally or alternatively, computing device 206 may be programmed with one or more of modules 102 and/or may store all or a portion of the data in database 120.

In one embodiment, one or more of modules 102 from FIG. 1 may, when executed by at least one processor of computing device 202 and/or 206, enable computing device 202 and/or 206 to use user-input information to identify computer security threats. For example, and as will be described in greater detail below, one or more of modules 102 may cause computing device 202 and/or 206 to (1) detect activity 208 at computing device 202, (2) determine whether a user provided input at computing device 202 when activity 208 occurred, (3) determine that activity 208 indicates a potential security threat based at least in part on whether the user provided input at computing device 202 when activity 208 occurred, and (4) perform a security action on activity 208 in response to the determination that activity 208 indicates a potential security threat.

Computing devices 202 and 206 generally represent any type or form of computing device capable of reading computer-executable instructions. Examples of computing devices 202 and 206 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. In some examples, computing devices 202 and 206 may include one or more input devices that enable users to provide input to computing devices 202 and 206. As shown in FIG. 2, computing device 202 may include an input device 210, and computing device 206 may include an input device 216. Input devices 210 and 216 generally represent any type or form of input device capable of providing human generated input to a computing system. Examples of input devices 210 and 216 include, without limitation, keyboards, computer mice, touchpads, touchscreens, microphones, video cameras, fingerprint scanners, or the like.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and 206.

FIG. 3 illustrates another exemplary implementation of exemplary system 100 in FIG. 1. As shown in FIG. 3, system 300 may include a computing device 302, a server 306, and a computing device 308 in communication via a network 304. In one example, computing device 302 may be programmed with one or more of modules 102 and/or may store all or a portion of the data in database 120. Additionally or alternatively, server 306 may be programmed with one or more of modules 102 and/or may store all or a portion of the data in database 120.

In one embodiment, one or more of modules 102 from FIG. 1 may, when executed by at least one processor of computing device 302 and/or server 306, enable computing device 302 and/or server 306 to use user-input information to identify computer security threats. For example, and as will be described in greater detail below, one or more of modules 102 may cause computing device 302 and/or server 306 to (1) detect activity 310 at computing device 302, (2) determine whether a user provided input at computing device 302 when activity 310 occurred, (3) determine that activity 310 indicates a potential security threat based at least in part on whether the user provided input at computing device 302 when activity 310 occurred, and (4) perform a security action on activity 310 in response to the determination that activity 310 indicates a potential security threat.

Computing devices 302 and 308 generally represent any type or form of computing device capable of reading computer-executable instructions. Examples of computing devices 302 and 308 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. In some examples, computing devices 302 and 308 may include one or more input devices that enable users to provide input to computing devices 302 and 308. As shown in FIG. 2, computing device 302 may include an input device 312, and computing device 308 may include an input device 318. Input devices 312 and 318 generally represent any type or form of input device capable of providing human generated input to a computing system. Examples of input devices 312 and 318 include, without limitation, keyboards, computer mice, touchpads, touchscreens, microphones, video cameras, fingerprint scanners, or the like.

Server 306 generally represents any type or form of computing device that is capable of reading computer-executable instructions. Examples of server 306 include, without limitation, application servers and database servers configured to provide various database services and/or run certain software applications.

Network 304 generally represents any medium or architecture capable of facilitating communication or data transfer. Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 304 may facilitate communication or data transfer using wireless or wired connections. In one embodiment, network 304 may facilitate communication between computing device 302, server 306, and/or computing device 308.

Figure 4:
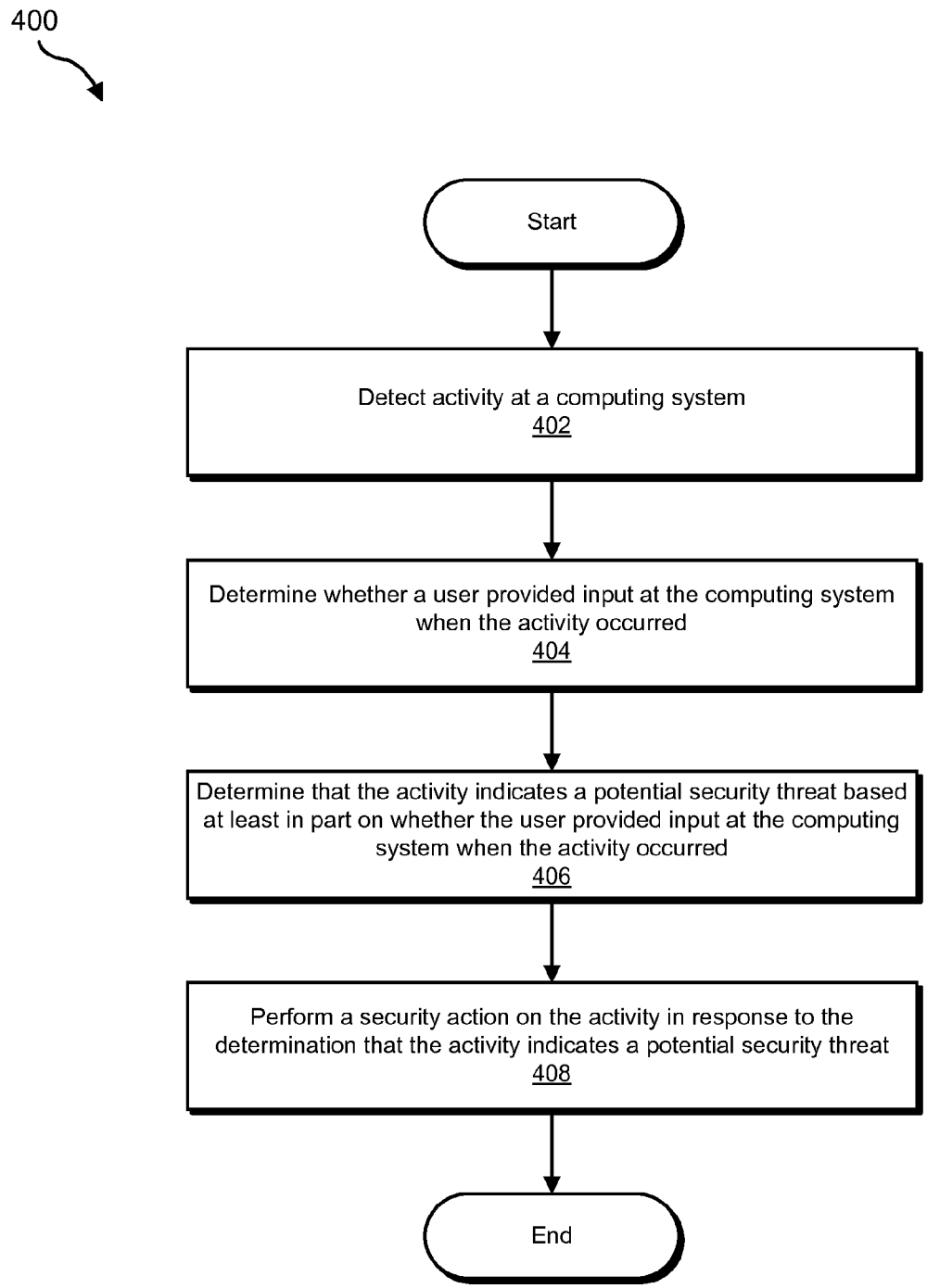
FIG. 4 is a flow diagram of an exemplary method for using user-input information to identify computer security threats.

FIG. 4 is a flow diagram of an exemplary computer-implemented method 400 for using user-input information to identify computer security threats. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 610 in FIG. 6, and/or portions of exemplary network architecture 700 in FIG. 7.

As illustrated in FIG. 4, at step 402 one or more of the systems described herein may detect activity at a computing system. For example, activity-detecting module 104 may, as part of computing device 202 in FIG. 2, detect activity 208 at computing device 202. In another example, activity-detecting module 104 may, as part of computing device 302 in FIG. 2, detect activity 310 at computing device 302.

The term "activity," as used herein, generally refers to any occurrence or event within a computing system. In some examples, the term "activity" may refer to user behavior, application behavior, file-system activity, processor activity, storage-device activity, network activity, and/or any other system or device activity.

The systems described herein may perform step 402 in any suitable manner. In one example, activity-detecting module 104 may represent a portion of a system designed to detect, collect, and/or manage information about activities that occur at a computing system and may detect an activity at the computing system as part of such a system. For example, activity-detecting module 104 may detect an activity at a computing system as part of a security information and event management system (SIEM), a security information management system (SIM), and/or security event manager (SEM). Additionally or alternatively, activity-detecting module 104 may represent a portion of a system designed to manage and/or monitor activities that occur at a computing system and may detect an activity at the computing system as part of such a system. For example, activity-detecting module 104 may detect an activity at a computing system as part of or via a firewall, router, switch, virtual private network, network-packet analyzer, antivirus system, intrusion-detection and/or intrusion-prevention system, vulnerability scanner, web server, web filter, proxy, database, mail and/or groupware system, authentication server, and/or system logger.

In some examples, activity-detecting module 104 may detect an activity at a computing system by receiving information about the activity. For example, activity-detecting module 104 may receive information about an activity that occurs at a computing system from a system designed to detect, collect, and/or manage information about activities that occur at the computing system. Additionally or alternatively, activity-detecting module 104 may receive information about an activity that occurs at a computing system directly from a system that manages and/or monitors activities that occur at the computing system. In at least one example, activity-detecting module 104 may detect an activity that occurs at a computing system by identifying information about the activity that is stored in a database. Using FIG. 2 as an example, activity-detecting module 104 may detect an activity that occurs at system 200 by identifying information about the activity within activity information 122 of database 120.

At step 404, one or more of the systems described herein may determine whether a user provided input at the computing system when the activity occurred. For example, input-determining module 106 may, as part of computing device 202 in FIG. 2, determine whether a user provided input at computing device 202 when activity 208 occurred. In another example, input-determining module 106 may, as part of computing device 302 in FIG. 3, determine whether a user provided input at computing device 302 when activity 310 occurred.

Figure 6:
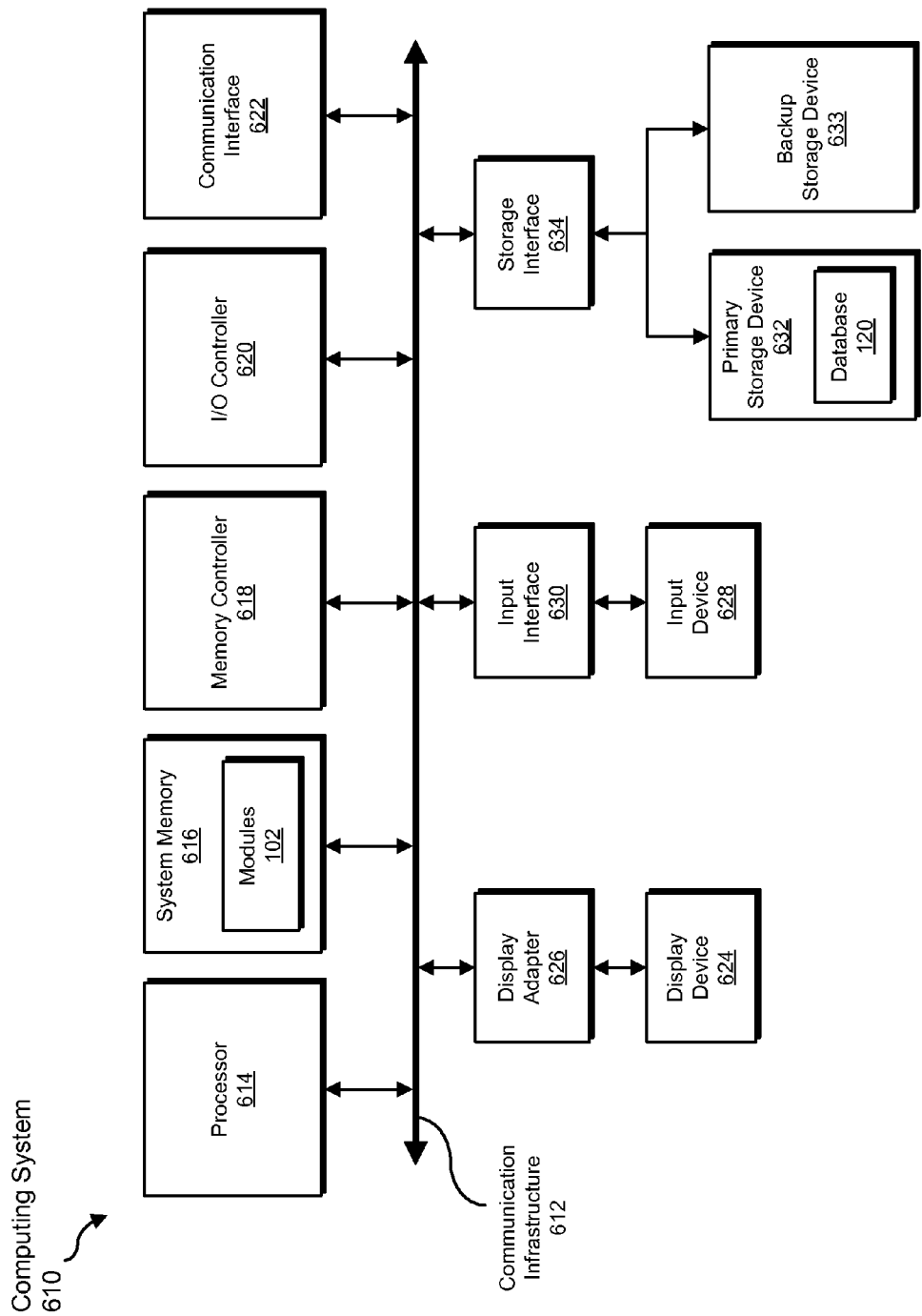
FIG. 6 is a block diagram of an exemplary computing system capable of implementing one or more of the embodiments described and/or illustrated herein.

As used herein, the terms "input" and "user input" generally refer to any data that a user provides to a computing system via an input device (e.g., input devices 210 and 216 in FIG. 2, input devices 312 and 318 in FIG. 3, and input device 628 in FIG. 6). Examples of input include, without limitation, keyboard input, mouse input, touchpad input, touchscreen input, voice input, gesture input, fingerprint input, or the like.

In some examples, the terms "input" and "user input" may refer to input received at a computing system from a user that is physically present at the computing system (e.g., data that a user provides to the computing system via an input device of the computing system) or input received at the computing system from a user that is remote from the computing system (e.g., data that a remote user provides to the computing system via an input device of a remote computing system). Using FIG. 2 as an example, user input 214 may represent input that a user provided to computing device 202 via input device 210, and remote user input 218 may represent input that a user provided to computing device 202 via input device 216 of computing device 206. In at least one example, the terms "input" and "user input" may refer to input received at a computing system via remote desktop software (e.g., MICROSOFT's REMOTE DESKTOP).

Returning to FIG. 4, the systems described herein may perform step 404 in any suitable manner. For example, input-determining module 106 may determine whether a user provided input at a computing system when an activity occurred at the computing system by determining whether the computing system received user input when the activity occurred, by determining whether an input device of the computing system was used when the activity occurred, by determining whether a device driver of the input device was active when the activity occurred, and/or by determining whether the user was physically present at the computing system when the activity occurred.

Input-determining module 106 may determine whether a computing system received user input when an activity occurred at the computing system in a variety of ways. For example, input-determining module 106 may determine whether a computing system received user input when an activity occurred at the computing system by polling the computing system for an indication of whether the computing system received user input when the activity occurred. In one example, input-determining module 106 may call a function of an operating system running on the computing system that returns a time at which the computing system received user input. Input-determining module 106 may use the time at which the computing system received user input to determine whether the computing system received user input when an activity occurred at the computing system.

In some examples if the computing system is running a MICROSOFT WINDOWS operating system, input-determining module 106 may call the function "GetLastInputInfo" that may provide the most recent time at which user input was received by the computing system. Input-determining module 106 may compare this time to the time at which the activity occurred to determine whether the computing system received user input when the activity occurred.

Additionally or alternatively, input-determining module 106 may determine whether a computing system received user input when an activity occurred at the computing system by installing a hook procedure to the computing system that notifies input-determining module 106 whenever the computing system receives user input. Input-determining module 106 may use these notifications to determine whether the computing system received user input when the activity occurred. For example if a computing system is running a MICROSOFT WINDOWS operating system, input-determining module 106 may install "SetWindowsHookEx" hooks to detect when keyboard and/or mouse input events and/or messages are received by the computing system.

In some examples by determining whether a computing system received user input when an activity occurred at the computing system, input-determining module 106 may determine whether a user was providing input at the computing system when the activity occurred. For example in the event that input-determining module 106 determines that a computing system received user input when an activity occurred at the computing system, input-determining module 106 may determine that a user provided input at the computing system when the activity occurred. On the other hand if input-determining module 106 determines that a computing system received no user input when an activity occurred at the computing system, input-determining module 106 may determine that no user provided input at the computing system when the activity occurred.

As mentioned above, input-determining module 106 may determine whether a user provided input at a computing system when an activity occurred by determining whether an input device of the computing system was being used when the activity occurred. In some examples, input-determining module 106 may determine whether an input device was being used at a computing system when an activity occurred by determining if a device driver for the input device (e.g., a software program running on a computing system that manages input/output to and from an input device attached to the computing system) was active when the activity occurred. In the event that input-determining module 106 determines that a device driver of an input device of a computing system was active when an activity occurred at the computing system, input-determining module 106 may determine that the input device was being used to provide input to the computing system when the activity occurred. On the other hand if input-determining module 106 determines that the device driver was inactive when the activity occurred, input-determining module 106 may determine that the input device was not being used to provide input to the computing system when the activity occurred.

In some examples by determining whether an input device of a computing system was being used when an activity occurred at the computing system, input-determining module 106 may determine whether a user was providing input at the computing system when the activity occurred. For example in the event that input-determining module 106 determines that an input device of a computing system was being used when an activity occurred at the computing system, input-determining module 106 may determine that a user provided input at the computing system when the activity occurred. On the other hand if input-determining module 106 determines that no input device of a computing system was being used when an activity occurred at the computing system, input-determining module 106 may determine that no user was providing input at the computing system when the activity occurred.

In addition to or as an alternative to determining whether a user provided input at a computing system when an activity occurred at the computing system, input-determining module 106 may determine whether a user was physically present at the computing system when the user provided input at the computing system. In some examples, input-determining module 106 may determine whether a user was physically present at a computing system when the user provided input by determining whether an input device of the computing system was used to provide the input. For example, if input-determining module 106 determines that at least one input device was being used at the computing system when the computing system received user input, input-determining module 106 may determine that a user was physically present at the computing system when the activity occurred. On the other hand, if input-determining module 106 determines that no input device was being used at the computing system when the computing system received user input, input-determining module 106 may determine that no user was physically present at the computing system when the activity occurred.

In some examples, input-determining module 106 may determine whether a user was located remote from a computing system when the user provided input at the computing device by determining whether the computing system received user input and by determining whether an input device of the computing system was used to provide the input. For example if input-determining module 106 determines that a computing system received user input but that no input device was being used at the computing system when computing system received user input, input-determining module 106 may determine that a user located remote from the computing system when the activity occurred provided the input at the computing system.

Input-determining module 106 may determine whether a user provided input at a computing system when an activity occurred at various times. In one example, input-determining module 106 may determine whether a user provided input at a computing system when an activity occurred by detecting, at the time the activity is detected, that a user was or was not providing input at the computing system. Additionally or alternatively, input-determining module 106 may determine whether a user provided input at a computing system when an activity occurred by creating a log of when users provide input at the computing system and by later determining if the log indicates that at the time the activity occurred a user was or was not providing input at the computing system.

In some examples after determining whether a user provided input at a computing system when an activity occurred, input-determining module 106 may associate information with the activity that indicates whether the user provided input when the activity occurred so that the information may be used as a factor in determining whether the activity indicates a security threat. For example after determining whether a user provided input at a computing system when an activity occurred, input-determining module 106 may store within activity information 122 and/or user-input information 124 information that (1) identifies the activity and (2) indicates whether a user provided input when the activity occurred, whether the computing system received user input when the activity occurred, whether an input device at the computing system was used to provide input when the activity occurred, whether a device driver for the input device was active when the activity occurred, and/or whether the user was physically present at the computing system when the activity occurred. As will be explained below, the systems and methods described herein may consider any or all of this information when determining whether the activity indicates a security threat.

At step 406, one or more of the systems described herein may determine that the activity indicates a potential security threat based at least in part on whether the user provided input at the computing system when the activity occurred. For example, threat-determining module 108 may, as part of computing device 202 in FIG. 2, determine that activity 208 indicates a potential security threat based at least in part on whether a user provided input at computing device 202 when activity 208 occurred. In another example, threat-determining module 108 may, as part of server 306 in FIG. 3, determine that activity 310 indicates a potential security threat based at least in part on whether a user provided input at computing device 302 when activity 310 occurred.

As used herein, the term "security threat" generally refers to any activity, circumstance, or entity that threatens the security of a computing system and/or data stored within the computing system. Examples of security threats include, without limitation, attacks (such as targeted attacks, advanced persistent threats, or the like), malware (such as viruses, worms, Trojan horses, rootkits, spyware, crimeware, or the like), vulnerabilities and exploits in application or system software (such as a buffer exploit in an Internet browser), an intruder, or a malicious or misbehaving insider.

The systems described herein may perform step 406 in any suitable manner. In one example, threat-determining module 108 may determine that an activity that occurred at a computing system indicates a potential security threat by simply determining that the way in which a user provided input at the computing system when the activity occurred indicates a potential security threat. For example in some instances remote access of a computing system may be prohibited or may otherwise represent a potential security threat. In these instances, threat-determining module 108 may determine that an activity indicates a potential security threat by determining that the activity is related to an attempt to remotely access the computing system. In at least one example, threat-determining module 108 may determine that an activity is related to an attempt to remotely access a computing system by determining that a user provided input at the computing system when the activity occurred and by determining that the user was located remote from the computing system when the user provided the input at the computing system.

Additionally or alternatively, threat-determining module 108 may determine that an activity that occurs at a computing system indicates a potential security threat based on normal and/or abnormal user-input patterns. For example, threat-determining module108 may determine that an activity that occurs at a computing system indicates a potential security threat based on whether it is normal or abnormal for a user to provide input at the computing system when the activity occurs, based on whether it is normal or abnormal for the computing system to receive user input when the activity occurs, based on whether it is normal or abnormal for an input device of the computing system to be used when the activity occurs, based on whether it is normal or abnormal for a device driver of the input device to be active when the activity occurs, and/or based on whether it is normal or abnormal for the user to be physically present at the computing system when the activity occurs. For example in the event that threat-determining module 108 determines that it is abnormal for an activity to occur at a computing system when a user does not provide input at the computing system when the activity occurs, threat-determining module 108 may determine that the activity may indicate a potential security threat if a user did not provide input when the activity occurred. On the other hand if threat-determining module 108 determines that it is normal for an activity to occur at the computing system when a user does not provide input at the computing system, threat-determining module 108 may determine that the activity may not represent a potential security threat if a user did not provide input when the activity occurred.

Threat-determining module 108 may identify normal and/or abnormal user-input patterns in a variety of ways. For example, threat-determining module 108 may identify normal and/or abnormal user-input patterns associated with a single user by monitoring the user and/or a computing system of the user to determine whether it is normal or abnormal for the user to provide input at the computing system when certain activities occur on the computing system, whether it is normal or abnormal for the computing system to receive user input when certain activities occur on the computing system, whether it is normal or abnormal for an input device of the computing system to be used when certain activities occur on the computing system, whether it is normal or abnormal for a device driver of the input device to be active when certain activities occur on the computing system, whether it is normal or abnormal for the user to be physically present at the computing system when certain activities occur on the computing system, and/or whether it is normal or abnormal for the user to be located remote from the computing system when certain activities occur on the computing system.

Additionally or alternatively, threat-determining module 108 may identify normal and/or abnormal user-input patterns associated with a group of users by monitoring the group of users and/or the computing systems of the group of users to determine whether it is normal or abnormal for users within the group of users to provide input at a computing system when certain activities occur, whether it is normal or abnormal for the computing systems of the group of users to receive user input when certain activities occur, whether it is normal or abnormal for an input device of the computing systems of the group of users to be used when certain activities occur, whether it is normal or abnormal for a device driver of an input device of the computing systems of the group of users to be active when certain activities occur, and/or whether it is normal or abnormal for users within the group of users to be physically present at a computing system when certain activities occur at the computing system, and/or whether it is normal or abnormal for users within the group of users to be located remote from a computing system when certain activities occur on the computing system.

In some examples, by identifying normal and/or abnormal user-input patterns associated with groups of users, threat-determining module 108 may eliminate or reduce false-positive security-threat determinations. For example, threat-determining module 108 may determine that an activity that occurs after a user installs a new application to a computing system of the user does not indicate a potential security-threat because the activity may not seem anomalous based at least in part on normal and/or abnormal user-input patterns associated with a group of users that have also installed the same application. Examples of groups of which threat-determining module 108 may determine normal and/or abnormal user-input patterns may include, without limitation, the employees within an enterprise, the world-wide user base of a security product, and/or any other suitable group of users.

In some examples, threat-determining module 108 may determine that an activity indicates a potential security threat if a user provides input when the activity occurs in a way that does not fit the user's typical patterns of providing user input. For example, threat-determining module 108 may determine that an activity indicates a potential security threat by (1) tracking when a user provides input at a computing system, (2) determine a pattern of when the user provides input at the computing system, and (3) determining that the activity occurred at a time that does not fit the pattern of when the user provides input at the computing system.

In some examples, threat-determining module 108 may determine that an activity indicates a potential security threat by (1) tracking how a user typically provides input at a computing system, (2) determine a pattern of how the user typically provides input at the computing system, and (3) determining that the activity occurred when the user provided input at the computing system in a way that does not fit the pattern of how the user typically provides input at the computing system.

At step 408, one or more of the systems described herein may perform a security action on the activity in response to the determination that the activity indicates a potential security threat. For example, security module 110 may, as part of computing device 202 in FIG. 2, perform a security action on activity 208 in response to the determination that activity 208 indicates a potential security threat. In another example, security module 110 may, as part of server 306 in FIG. 3, perform a security action on activity 310 in response to the determination that activity 310 indicates a potential security threat.

The systems described herein may perform step 408 in any suitable manner. In some embodiments, security module 110 may perform a security action on an activity by preventing the activity from occurring. For example if remote access of a computing system is prohibited, and threat-determining module 108 determines that an activity is a possible security threat because it represents an attempt to remotely access the computing system, security module 110 may block the attempt to remotely access the computing system. In another example, if threat-determining module 108 determines that an activity indicates a possible security threat because when the activity occurred the user involved in the activity provided input in a way that does not fit a pattern of providing input of the user, security module 110 may block the activity.

In some examples, security module 110 may perform a security action on an activity by creating a log of the activity. In the log, security module 110 may record the context within which the activity occurred (e.g., information about the activity, information about the computing system on which the activity occurred, the time at which the activity occurred, and/or an indication of whether a user provided input at the computing system when the activity occurred). For example, if threat-determining module 108 determines that an activity represents a possible security threat because when the activity occurred the user involved in the activity provided input in a way that does not fit a pattern of providing input of the user, security module 110 may create a log of the activity. In some examples, security module 110 may further send the log to an administrator or user of the computing system and/or to another destination.

In some examples upon determining that an activity indicates a potential security threat, security module 110 may alert an administrator or a user of the computing system of the potential security threat. Additionally or alternatively, security module 110 may alert a third party of the potential security threat. For example, security module 110 may notify a security vendor, and application provider, or an operating system provider of the potential security threat. Upon completion of step 408, exemplary method 400 in FIG. 4 may terminate.

Figure 5:
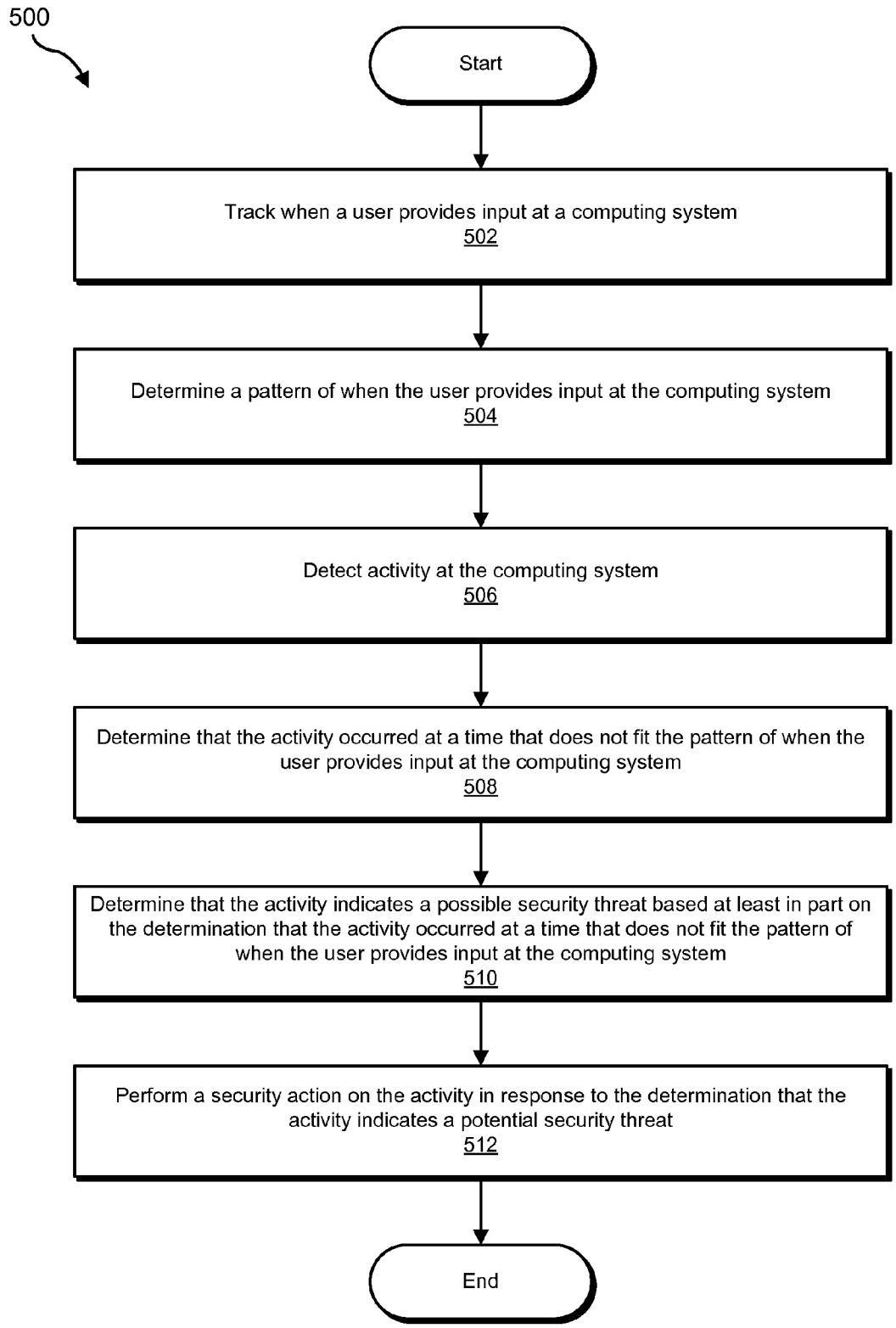
FIG. 5 is a flow diagram of an exemplary method for using user-input information to identify computer security threats.

As mentioned above, the systems described herein may identify potential security threats based on a user's pattern of providing input at a computing system. FIG. 5 is a flow diagram of an exemplary computer-implemented method 500 for using user-input patterns to identify computer security threats. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, system 300 in FIG. 3, computing system 610 in FIG. 6, and/or portions of exemplary network architecture 700 in FIG. 7.

As illustrated in FIG. 5, at step 502 one or more of the systems described herein may track when a user provides input at a computing system. For example, input-determining module 106 may, as part of computing device 202 in FIG. 2, track when a user of computing device 202 provides input at computing device 202.

The systems described herein may perform step 502 in any suitable manner. For example, input-determining module 106 may track when a user provides input at a computing system by determining when the user is logged into the computing system and by logging when the user provides input at the computing system, by logging when the computing system receives user input while the user is logged into the computing system, by logging when an input device of the computing system is used while the user is logged into the computing system, by logging when a device driver of the input device is active while the user is logged into the computing system, and/or by logging when the user is physically present at the computing system.

At step 504, one or more of the systems described herein may determine a pattern of when the user provides input at the computing system. For example, threat-determining module 108 may, as part of computing device 202 in FIG. 2, determine a pattern of when the user of computing device 202 provides input at computing device 202.

The systems described herein may perform step 504 in any suitable manner. In one example, threat-determining module 108 may determine a pattern of when a user provides input at a computing system by identifying one or more time periods during which the user consistently does or does not provide input at the computing system. For example, threat-determining module 108 may determine a pattern of when a user provides input at a computing system by identifying the days of the week on which the user provides input at the computing system, by identifying the days of the week on which the user does not provide input at the computing system, by identifying the hours of the day during which the user provides input at the computing system, and/or by identifying the hours of the day during which the user provides input at the computing system. In some examples, threat-determining module 108 may use the pattern of when a user provides input at a computing system to determine the user's normal working hours.

At step 506, one or more of the systems described herein may detect activity at the computing system. For example, activity-detecting module 104 may, as part of computing device 202 in FIG. 2, detect activity 208 at computing device 202. Step 506 is similar to step 402 in FIG. 4, therefore, the discussion of step 402 may also apply to step 506.

At step 508, one or more of the systems described herein may determine that the activity occurred at a time the does not fit the pattern of when the user provides input at the computing system. For example, threat-determining module 108 may, as part of computing device 202 in FIG. 2, determined that activity 208 occurred at a time that does not fit the pattern of when the user of computing device 202 provides input at computing device 202.

The systems described herein may perform step 508 in any suitable manner. In one example, threat-determining module 108 may determine that an activity occurred at a time the does not fit a pattern of when a user provides input at a computing system by determining that the activity occurred during a time period during which the user consistently has not provided input at the computing device. For example, threat-determining module 108 may determine that an activity occurred at a time the does not fit a pattern of when a user provides input at a computing system by determining that the activity occurred on a day of the week on which the user has not typically provided input at the computing system and/or by determining that the activity occurred during an hour of the day during which the user typically has not provided input at the computing system. In at least one example, threat-determining module 108 may determine that an activity occurred at a time the does not fit a pattern of when a user provides input at a computing system by determining that the activity occurred outside of the user's normal working hours.

At step 510, one or more of the systems described herein may determine that the activity represents a possible security threat based at least in part on the determination that the activity occurred at a time that does not fit the pattern of when the user provides input at the computing system. For example, threat-determining module 108 may, as part of computing device 202 in FIG. 2, determine that activity 208 represents a possible security threat based at least in part on the determination that activity 208 occurred at a time that does not fit the pattern of when the user of computing device 202 provides input at computing device 202. Step 510 is similar to step 406 in FIG. 4, therefore, the discussion of step 406 may also apply to step 510.

At step 512, one or more of the systems described herein may perform the security action on the activity in response to the determination that the activity indicates a potential security threat. For example, security module 110 may, as part of computing device 202 in FIG. 2, perform the security action on the activity in response to the determination that the activity indicates a potential security threat. Step 512 is similar to step 408 in FIG. 4, therefore, the discussion of step 408 may also apply to step 512. Upon completion of step 512, exemplary method 500 in FIG. 5 may terminate.

As explained above, by leveraging user-input information that indicates if, when, and/or how users provide input at computing systems, the systems and methods described herein may enable detection of security threats. Furthermore, in some examples, by using user-input information that indicates when a user provides input at a computing system to establish a pattern of when the user provides input at the computing system, the systems and methods described herein may detect anomalous user-input events.

For example, the systems and methods described herein may use user-input information to detect and block a prohibited attempt to remotely access a computing system by (1) detecting activity at the computing system, (2) determining that a user was not physically present at the computing system when the activity occurred (e.g., by determining that an input device of the computing system was not used when the attempt to remotely access the computing system occurred), (3) determining that the activity represents an attempt to remotely access the computing system based on the determination that a user was not physically present at the computing system when the activity occurred, and (4) blocking the activity in response to the determination that the activity represents an attempt to remotely access the computing system.

In another example, the systems and methods described herein may use user-input information to detect and/or block an anomalous activity at a computing system by (1) detecting the activity at the computing system, (2) determining that a user provided input at the computing system when the activity occurred, (3) determining that the activity indicates a potential security threat based at least in part on determining that the activity occurred at a time that does not fit the normal pattern of when the user typically provides input at the computing system, and (4) blocking the activity in response to the determination that the activity indicates a potential security threat.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 4). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
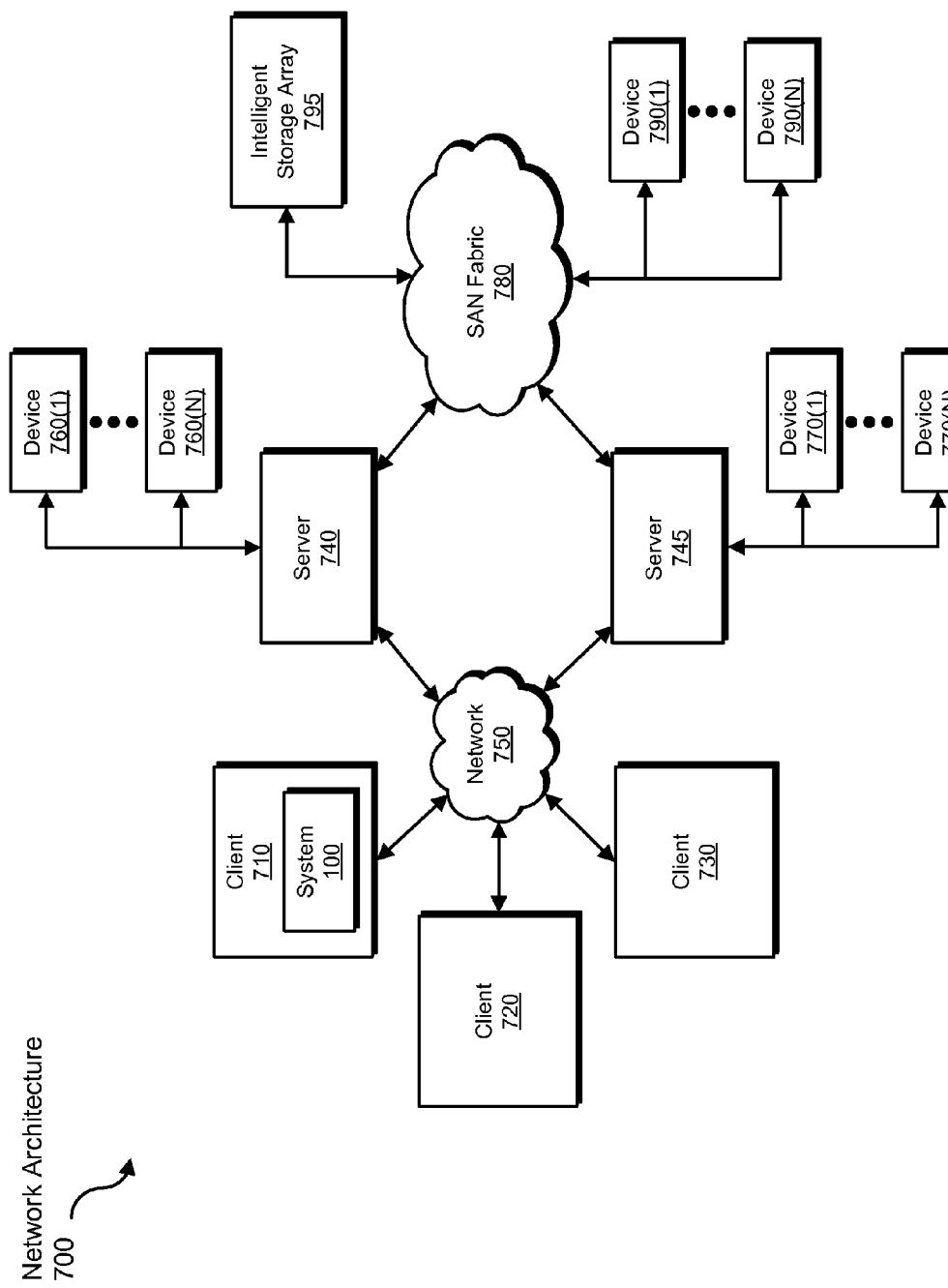
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 4). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for using user-input information to identify computer security threats.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive user-input information to be transformed, transform the user-input information into a determination of whether a user provided input at a computing system when an potentially malicious activity occurred at the computing system, output a result of the transformation to a system for detecting security threats, use the result of the transformation to detect a security threat at the computing system, and store the result of the transformation to the system for detecting security threats. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for using user-input information to identify computer security threats, at least a portion of the method being performed by a computing device comprising at least one processor, the method comprising:
  detecting activity at a computing system;
  determining whether a user-input activity occurred at the computing system at the same time as the activity, the user-input activity comprising a user providing input at the computing system;
  determining, based at least in part on whether a user-input activity occurred at the computing system at the same time as the activity, that the activity indicates a potential security threat;
  performing a security action on the activity in response to the determination that the activity indicates a potential security threat.

2. The computer-implemented method of claim 1, wherein:
  determining whether a user-input activity occurred at the computing system at the same time as the activity comprises determining that no user-input activity occurred at the computing system at the same time as the activity by determining that the user did not provide input at the computing system when the activity occurred;
  the determination that the activity indicates a potential security threat is based at least in part on the determination that the user did not provide input at the computing system when the activity occurred.

3. The computer-implemented method of claim 2, wherein:
  determining that the user did not provide input at the computing system when the activity occurred comprises determining that the user was not physically present at the computing system when the activity occurred;
  the determination that the activity indicates a potential security threat is based at least in part on the determination that the user was not physically present at the computing system when the activity occurred.

4. The computer-implemented method of claim 2, wherein:
  determining that the user did not provide input at the computing system when the activity occurred comprises determining that an input device of the computing system was not used to provide input at the computing system when the activity occurred;
  the determination that the activity indicates a potential security threat is based at least in part on the determination that the input device of the computing system was not used to provide input at the computing system when the activity occurred.

5. The computer-implemented method of claim 2, wherein:
  determining that the user did not provide input at the computing system when the activity occurred comprises determining that a device driver for an input device of the computing system was inactive when the activity occurred;
  the determination that the activity indicates a potential security threat is based at least in part on the determination that the device driver for the input device of the computing system was inactive when the activity occurred.

6. The computer-implemented method of claim 2, wherein determining that the user did not provide input at the computing system when the activity occurred comprises determining that the computing system did not receive user input when the activity occurred;
  the determination that the activity indicates a potential security threat is based at least in part on the determination that the computing system did not receive user input when the activity occurred.

7. The computer-implemented method of claim 2, wherein determining that the activity indicates a potential security threat comprises:
  determining, before detecting the activity at the computing system, that it is abnormal for the activity to occur at the computing system when the user does not provide input at the computing system;
  determining, based at least in part on the determination that it is abnormal for the activity to occur at the computing system when the user does not provide input at the computing system, that the activity indicates a potential security threat.

8. The computer-implemented method of claim 2, wherein determining that the activity indicates a potential security threat comprises:
  identifying user-input patterns of a group of users;
  determining, before detecting the activity at the computing system and based at least in part on the user-input patterns of the group of users, that it is abnormal for the activity to occur at a computing system of at least one user within the group of users when the user within the group of users does not provide input at the computing system of the user within the group of users;
  determining, based at least in part on the determination that it is abnormal for the activity to occur at the computing system of the user within the group of users when the user within the group of users does not provide input at the computing system of the user within the group of users, that the activity indicates a potential security threat.

9. The computer-implemented method of claim 1, wherein:
  determining whether a user-input activity occurred at the computing system at the same time as the activity comprises determining that a user-input activity occurred at the computing system at the same time as the activity by determining that the user provided input at the computing system when the activity occurred;
  determining that the activity indicates a potential security threat comprises:
    before detecting the activity at the computing system:
      tracking when the user provides input at the computing system;
      determining, based at least in part on when the user provides input at the computing system, a pattern of when the user provides input at the computing system;
    determining that the activity occurred at a time that does not fit the pattern of when the user provides input at the computing system;
    determining, based at least in part on the determination that the activity occurred at a time that does not fit the pattern of when the user provides input at the computing system, that the activity represents a possible security threat.

10. The computer-implemented method of claim 1, wherein determining whether a user-input activity occurred at the computing system at the same time as the activity is based at least in part on determining when the user last provided input at the computing system.

11. The computer-implemented method of claim 1, wherein determining that the activity indicates a potential security threat comprises determining that the activity is an unauthorized attempt to remotely access the computing system based at least in part on:
  a determination that a user-input activity occurred at the computing system at the same time as the activity;

a determination that the user was not physically present at the computing system when the activity occurred.

12. A system for using user-input information to identify computer security threats, the system comprising:
an activity-detecting module that detects activity at a computing device;
an input-determining module that determines whether a user-input activity occurred at the computing device at the same time as the activity, the user-input activity comprising a user providing input at the computing device;
a threat-determining module that determines, based at least in part on whether a user-input activity occurred at the computing device at the same time as the activity, that the activity indicates a potential security threat;
a security module that performs a security action on the activity in response to the determination that the activity indicates a potential security threat;
at least one processor that executes the activity-detecting module, the input-determining module, the threat-determining module, and the security module.

13. The system of claim 12, wherein:
the input-determining module determines whether a user-input activity occurred at the computing device at the same time as the activity by determining that no user-input activity occurred at the computing device at the same time as the activity by determining that the user did not provide input at the computing device when the activity occurred;
the threat-determining module determines that the activity indicates a potential security threat based at least in part on the determination that the user did not provide input at the computing device when the activity occurred.

14. The system of claim 13, wherein:
the input-determining module determines that the user did not provide input at the computing device when the activity occurred by determining that the user was not physically present at the computing device when the activity occurred;
the threat-determining module determines that the activity indicates a potential security threat based at least in part on the determination that the user was not physically present at the computing device when the activity occurred.

15. The system of claim 13, wherein:
the input-determining module determines that the user did not provide input at the computing device when the activity occurred by determining that an input device of the computing device was not used to provide input at the computing device when the activity occurred;
the threat-determining module determines that the activity indicates a potential security threat based at least in part on the determination that the input device of the computing device was not used to provide input at the computing device when the activity occurred.

16. The system of claim 13, wherein:
the input-determining module determines that the user did not provide input at the computing device when the activity occurred by determining that a device driver for an input device of the computing device was inactive when the activity occurred;
the threat-determining module determines that the activity indicates a potential security threat based at least in part on the determination that the device driver for the input device of the computing device was inactive when the activity occurred.

17. The system of claim 13, wherein the threat-determining module determines that the activity indicates a potential security threat by:
determining, before the detection of the activity at the computing device, that it is abnormal for the activity to occur at the computing device when the user does not provide input at the computing device;
determining, based at least in part on the determination that it is abnormal for the activity to occur at the computing device when the user does not provide input at the computing device, that the activity indicates a potential security threat.

18. The system of claim 13, wherein the threat-determining module determines that the activity indicates a potential security threat by:
identifying user-input patterns of a group of users;
determining, before the detection of the activity at the computing system and based at least in part on the user-input patterns of the group of users, that it is abnormal for the activity to occur at a computing system of at least one user within the group of users when the user within the group of users does not provide input at the computing system of the user within the group of users;
determining, based at least in part on the determination that it is abnormal for the activity to occur at the computing system of the user within the group of users when the user within the group of users does not provide input at the computing system of the user within the group of users, that the activity indicates a potential security threat.

19. The system of claim 12, wherein:
the input-determining module determines whether a user-input activity occurred at the computing device at the same time as the activity by determining that a user-input activity occurred at the computing device at the same time as the activity by determining that the user provided input at the computing device when the activity occurred;
the threat-determining module determines that the activity indicates a potential security threat by:
before the detection of the activity at the computing device:
tracking when the user provides input at the computing device;
determining, based at least in part on when the user provides input at
the computing device, a pattern of when the user provides input at the computing device;
determining that the activity occurred at a time that does not fit the pattern of when the user provides input at the computing device;
determining, based at least in part on the determination that the activity occurred at a time that does not fit the pattern of when the user provides input at the computing device, that the activity represents a possible security threat.

20. A non-transitory computer-readable medium comprising one or more computer-executable instructions that, when executed by at least one processor of a computing device, cause the computing device to:
detect activity at a computing system;
determine whether a user-input activity occurred at the computing system at the same time as the activity, the user-input activity comprising a user providing input at the computing system;

determine, based at least in part on whether a user-input activity occurred at the computing system at the same time as the activity, that the activity indicates a potential security threat;
perform a security action on the activity in response to the determination that the activity indicates a potential security threat.

* * * * *